Jan. 29, 1952
O. C. TURNER
2,584,067
SHUTTER RELEASE
Filed Aug. 4, 1950
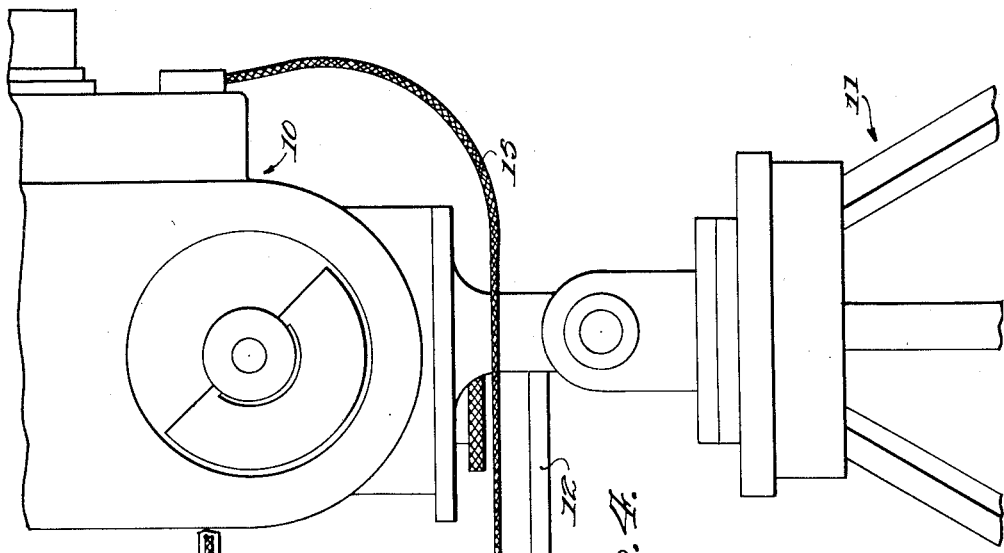
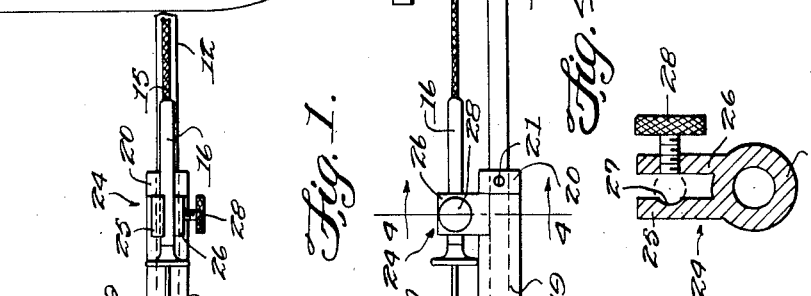
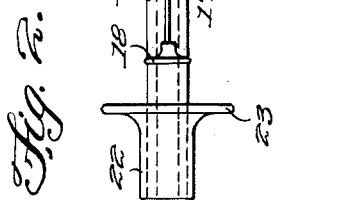
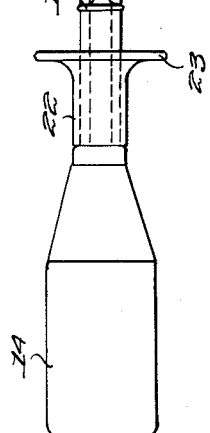
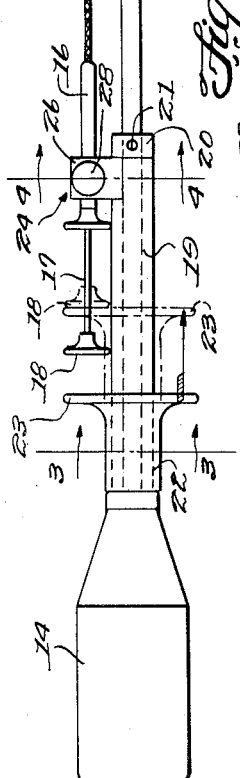
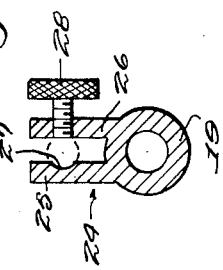
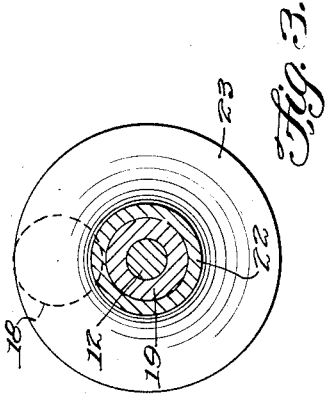
INVENTOR.
Osband C. Turner,
BY Victor J. Evans & Co.
ATTORNEYS Patented Jan. 29, 1952

2,584,067

UNITED STATES PATENT OFFICE 2,584,067

SHUTTER RELEASE

Osband C. Turner, Savannah, Ga.

Application August 4, 1950, Serial No. 177,705

4 Claims. (Cl. 74—479)

This invention relates to a camera, and more particularly to a shutter release-operating mechanism for a camera.

The object of the invention is to provide a manually operable mechanism which will enable a person to operate the tripod head and shutter of a camera with one hand.

Another object of the invention is to provide a camera attachment which includes a movable sleeve that can be readily moved to actuate the shutter release of the camera, the attachment being constructed so that the operator can use the same hand to adjust the camera and move the sleeve, whereby the other hand will be free for performing any desired operation.

A further object of the invention is to provide a shutter-release-operating mechanism which is extremely simple and inexpensive to manufacture.

Other objects and advantages will be apparent during the course of the following description.

In the accompanying drawings forming a part of this application, and in which like numerals are used to designate like parts throughout the same:

Figure 1 is an elevational view of the shutter-release mechanism constructed according to the present invention; showing the mechanism in operable position on a camera;

Figure 2 is a fragmentary top plan view of the assembly of Figure 1;

Figure 3 is an enlarged sectional view taken on the line 3—3 of Figure 1;

Figure 4 is an enlarged sectional view taken on the line 4—4 of Figure 1.

Referring in detail to the drawings, the numeral 10 designates a conventional camera, such as movie camera, and the camera 10 may be supported on a conventional tripod 11, Figure 1. An elongated shank or stem 12 is provided for operating the tripod head, and a hand grip 14 is mounted on the outer end of the shank 12 for conveniently actuating the shank 12.

The present invention is directed to an attachment which will permit the operator to operate the tripod head and also operate the shutter-release of the camera with one hand. The shutter release is conventional and includes a flexible hose 15 which has a casing 16 connected to its free end. A plunger rod 17 is slidably or reciprocably mounted in the casing 16 and hose 15, and an actuating button 18 is arranged on the outer or free end of the plunger rod 17.

The attachment of the present invention includes an elongated body member 19 which rotatably received therein the shank 12, and a collar 20 abuts one end of the body member 19 in order to prevent accidental longitudinal shifting movement of the body member 19 on the shank 12. The collar 20 is detachably connected to the shank 12 by a suitable set screw 21, Figure 1.

Slidably arranged on the body member 19 is a sleeve 22, and the sleeve 22 is provided with an annular flange 23 which is adapted to engage the actuating button 18 to thereby release the shutter of the camera. The sleeve 22 is moved along the body member 19 by pressure from the operator's thumb, the operator conveniently gripping the member 14.

The attachment of the present invention further includes a clamp 24 for releasably holding the casing 16 of the shutter release mechanism. The clamp 24 includes a pair of spaced walls or ears 25 and 26 which project from the body member 19 or are formed integrally therewith. The inner surface of the ear 25 is provided with an arcuate cutout or recess 27, Figure 4, for snugly receiving therein a portion of the casing 16. A set screw 28 is carried by the other ear 26, and the set screw 28 is adapted to be moved into engagement with the casing 16, so as to positively clamp the casing 16 between the ears 25 and 26.

In use, the operator grips the member 14 and then pushes the sleeve 22 forwardly with the fingers or thumb. Thus, the sleeve 22 is pushed forwardly from the solid line position shown in Figure 1 to the dotted line position shown in Figure 1, and this causes the annular flange 23 to engage the actuating button 18 to thereby release the shutter of the camera. Thus, it will be seen that the attachment of the present invention enables the user or operator of the camera to operate the tripod head and also operate the shutter release with one hand.

The attachment of the present invention is especially suitable for movie cameras, although it can be used for other types of photographic equipment. By using the attachment of the present invention, the other hand of the user will be free and can be used for steadying or other purposes. The body member 19 rotatably receives therein the shank 12, so that the shank can be tightened or loosened without causing any jamming between the parts 12 and 19. The member 14 can be rotated to turn the shank 12 so that the head of the camera 10 can be rotated or adjusted in the usual manner. The collar 20 is secured to the shank 12 by the set screw 21, and the collar 20 prevents the body member 19 from moving forwardly when the sleeve 22 is pushed forwardly against the button 18.

I claim:

1. In a camera, the combination with an elongated handle shank and a shutter release including an actuating button, of a mechanism for operating said shutter release button, said mechanism comprising a tubular body member rotatably receiving said shank, a clamp projecting from said body member for holding said shutter release, and a sleeve slidably mounted on said body member for engagement with said button.

2. In a camera, the combination with an elongated handle shank and a shutter release including an actuating button, of a mechanism for operating said shutter release button, said mechanism comprising a tubular body member rotatably receiving said shank, a clamp projecting from said body member for holding said shutter release, a sleeve slidably mounted on said body member for engagement with said button, and a collar connected to said shank and abutting said body member for preventing longitudinal movement of said body member on said shank.

3. In a camera, the combination with an elongated handle shank and a shutter release including an actuating button, of a mechanism for operating said shutter-release button, said mechanism comprising a tubular body member rotatably receiving said shank, a clamp projecting from said body member for holding said shutter release, and a sleeve embodying an annular flange slidably mounted on said body member for engagement with said button.

4. In a camera, the combination with an elongated handle shank, a hand grip mounted on an end of said shank, a shutter-release mechanism including a casing, a flexible hose connected to said casing, a plunger rod slidably arranged in said casing and hose, an actuating button arranged on the end of said rod, of an attachment for actuating said button, said attachment comprising a hollow body member rotatably receiving said shank, a sleeve slidably positioned on said body member and including an annular flange for engagement with said button, and a clamp for supporting said casing, said clamp including a pair of spaced ears projecting from said body member, there being an arcuate recess in one of said ears for snugly receiving therein a portion of said casing, and a set screw carried by the other ear for engagement with said casing.

OSBAND C. TURNER.

REFERENCES CITED

The following references are of record in the file of this patent:

UNITED STATES PATENTS

| Number | Name | Date |
|---|---|---|
| 1,214,700 | Marks | Feb. 6, 1917 |
| 1,543,145 | Yeomans | June 23, 1925 |
| 1,556,411 | Brown | Oct. 6, 1925 |
| 2,263,046 | Mendelsohn et al. | Nov. 18, 1941 |
| 2,498,137 | Ryder | Feb. 21, 1950 |